United States Patent [19]

Malville

[11] Patent Number: 5,745,027
[45] Date of Patent: Apr. 28, 1998

[54] DATA COMMUNICATION SYSTEM EMPLOYING CARRIER CURRENTS, IN PARTICULAR FOR A MOTOR VEHICLE

[75] Inventor: Joël Malville, Chambly, France

[73] Assignees: Automobiles Peugeot, Paris; Automobiles Citroen, Neuilly Sur Seine, both of France

[21] Appl. No.: 546,714

[22] Filed: Oct. 23, 1995

[30] Foreign Application Priority Data

Oct. 26, 1994 [FR] France ................... 94 12831

[51] Int. Cl.$^6$ .................................................. H04M 11/04
[52] U.S. Cl. ..................... 340/310.01; 340/428; 340/514; 307/10.1; 701/29; 701/30
[58] Field of Search .................. 340/310.01, 310.02, 340/825.05, 428, 458, 505, 514; 370/85.1, 85.6; 307/10.1; 701/29, 30, 36

[56] References Cited

U.S. PATENT DOCUMENTS

| | | | |
|---|---|---|---|
| 4,463,341 | 7/1984 | Iwasaki | 340/310.01 |
| 4,907,222 | 3/1990 | Slavik | 370/85.7 |
| 5,309,436 | 5/1994 | Hirano et al. | 370/85.1 |

FOREIGN PATENT DOCUMENTS

| | | |
|---|---|---|
| 0 393 233 | 10/1990 | European Pat. Off. . |
| 0 454 534 | 10/1991 | European Pat. Off. . |
| 29 36 929 | 4/1981 | Germany . |

*Primary Examiner*—Brent A. Swarthout
*Assistant Examiner*—Daryl C. Pope
*Attorney, Agent, or Firm*—Burns, Doane, Swecker & Mathis, L.L.P.

[57] ABSTRACT

This data communication system employing carrier currents comprises a power supply (4), to which are connected supply lines (2, 3) to which supply lines are connected functional devices (6) of the vehicle communicating with one another. These functional devices (6) comprise a communication interface (10) and an associated application equipment (12) communicating with other functional devices (6) through its communication interface (10), the communication interface (10) comprising means for testing the validation of at least one predetermined criterion and means commanding control means of the power supply of the associated application equipment (12) for commanding, as a function of the validation of the predetermined criterion, the feeding or otherwise of the associated application equipment (12) by the supply lines (2, 3).

10 Claims, 5 Drawing Sheets

5,745,027

DATA COMMUNICATION SYSTEM EMPLOYING CARRIER CURRENTS, IN PARTICULAR FOR A MOTOR VEHICLE

BACKGROUND OF THE INVENTION

1. Field of the Invention

The present invention relates to a data communication system employing carrier currents in particular for a motor vehicle.

The invention relates more particularly to a data communication system employing carrier currents of the type comprising an electric power supply, to which are connected supply lines constituting a data communication network to which are connected functional devices of the vehicle at least some of which are adapted to communicate with one another.

2. Discussion of Related Art

Data communication systems of this type are known in the art.

Indeed, it is known in motor vehicles to arrange the functional devices to communicate with each other through supply lines connected to the battery of the vehicle by means of the carrier current technique.

For example, these functional devices may be devices controlling the engine, sensors, signaling and lighting devices, anti-theft systems or sound producing systems.

However, these systems have a number of drawbacks since they require that the functional devices connected to the network be permanently supplied with electric power, even when they are not in use, so as to be capable of receiving data from the network and, as the case may be, actuated.

In some cases, for example, when the vehicle is stationary with the engine turned off, the data communication system remains in operation so as to perform certain particular functions, such as the closing of the openings of the vehicle and the control of the anti-theft alarm which remain of use even in this particular mode of operation of the vehicle.

Under these conditions, other functional devices, such as the devices controlling the engine, also remain connected to the supply network and are supplied power, owing to the design of the network and of the functional devices, even when they are not in use.

Each functional device, whether it is in use or otherwise, therefore consumes electric power coming from the battery of the vehicle.

Thus, the use of data communication systems employing carrier current techniques of this type results in a high total consumption of electric power and a rapid drop in the charge of the battery, even if the quantity of data conducted by the network is very small and even zero.

SUMMARY OF THE INVENTION

An object of the invention is therefore to overcome this problem and in particular to provide a data communication system employing the technique of carrier currents which results in a low consumption of electric power.

The invention therefore provides a data communication system employing carrier currents, in particular for a motor vehicle, of the type comprising an electric power supply to which are connected supply lines constituting a data communication network, to which lines are connected functional devices of the vehicle of which at least some are adapted to communicate with one another, characterized in that at least some of the functional devices comprise a communication interface and associated application equipment communicating with other functional devices through its communication interface, the communication interface comprising means for testing the validation of at least a predetermined criterion and means for commanding the control means of the power supply of the associated application equipment for commanding, as a function of the validation of said predetermined criterion, the feeding or otherwise of the associated application equipment by the supply lines.

Particular embodiments of the invention may have one or more of the following features:

- the control means of the power supply of the application equipment are integrated within the latter and receive on the input command data from the command means provided in the communication interface, through a command line, so as to feed or not feed, on the output, the associated application equipment by means of the supply lines,
- the control means of the power supply of the application equipment are integrated within the communication interface and receive on the input command data from the command means so as to feed or not feed, on the output, by means of the supply lines, the associated application equipment through a power line,
- the communication interface comprises protocol management means and control means of the supply of said protocol management means commanded by said command means as a function of the validation of said predetermined criterion, for feeding or not feeding said protocol management means,
- the means for testing the validation of the predetermined criterion comprise means for detecting predetermined data of validation of the criterion sent out on the network by at least one functional device,
- the predetermined data are formed by at least one signal having a predetermined carrier frequency,
- some functional devices comprise means for transmitting on the network at least one signal of predetermined carrier frequency,
- the predetermined data are formed by at least one series of predetermined data,
- some functional devices comprise means for transmitting on the network at least one series of predetermined data,
- the means for testing the validation of the predetermined criterion comprise means for analyzing the activity ratio of the communication network.

BRIEF DESCRIPTION OF THE DRAWINGS

A better understanding of the invention will be had from the following description which is given solely by way of example with reference to the accompanying drawings, in which.

DETAILED DESCRIPTION

Figure 1:
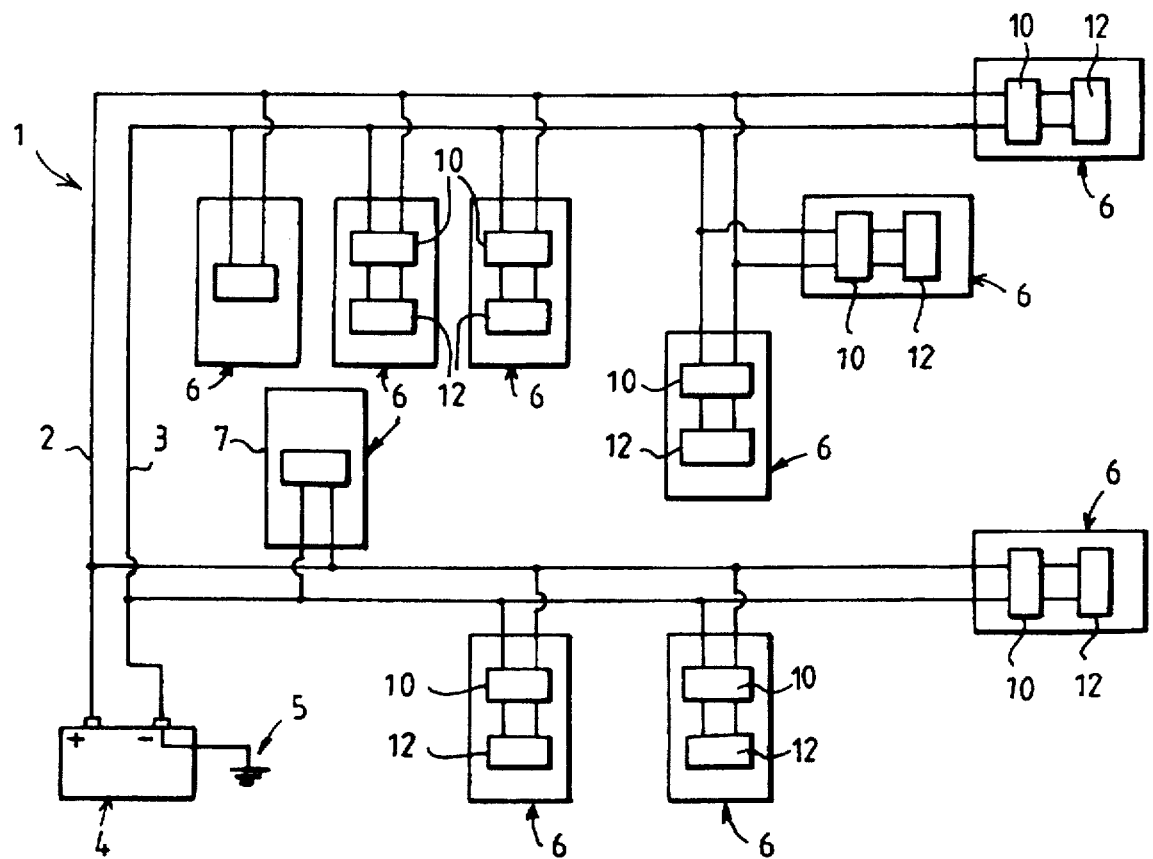
FIG. 1 is a block diagram of an information communication system according to the invention.

As can be seen in FIG. 1, a data communication system according to the invention comprises a communication network 1 comprising supply lines 2, 3 connected to an electric power supply 4 for example formed by a battery of a motor vehicle.

Conventionally, one of the supply lines 2 is connected to the positive terminal of the battery 4 while the other line 3 is connected to the negative terminal. The latter is also connected to the metal structure of the vehicle diagrammatically represented at 5.

Functional devices, each designated by the general reference numeral 6, are connected to the supply lines 2, 3 so as to, on one hand, be supplied with electric power by the battery 4, and, on the other hand, in respect of those adapted to communicate, to transmit data on the network 1 formed by the lines 2, 3, or receive data therefrom. The data circulating on the network are multiplexed.

These functional devices 6 may be for example devices monitoring or controlling the engine, sensors, signaling and lighting devices, anti-theft systems, sound reproducing systems, or a central unit managing the network, diagrammatically represented at 7 in FIG. 1.

According to the invention, some of the functional devices 6 connected to the network comprise a communication interface 10 associated with an application equipment 12.

Figure 2:
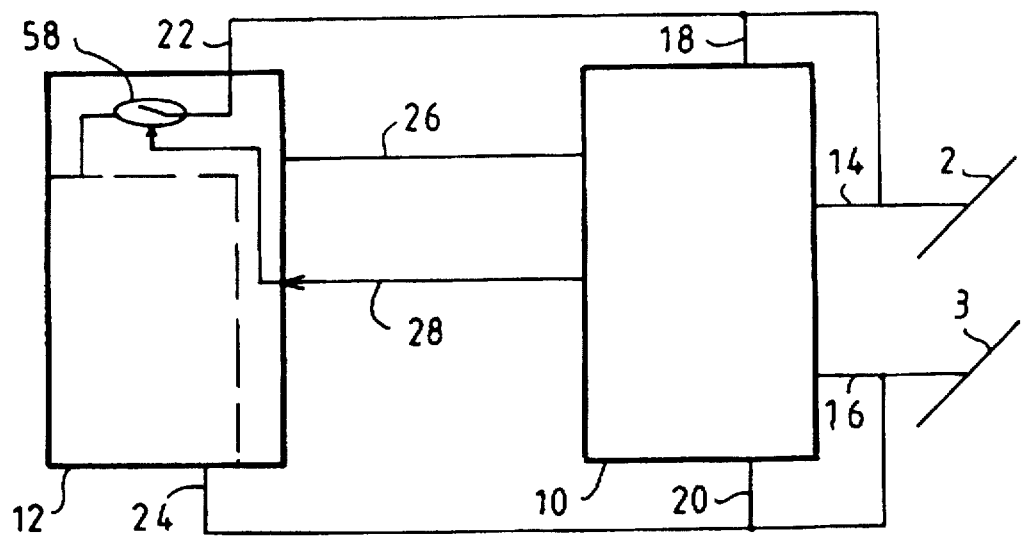
FIGS. 2 and 3 are block diagrams of two embodiments of functional devices of a communication system according to the invention.
Figure 3:
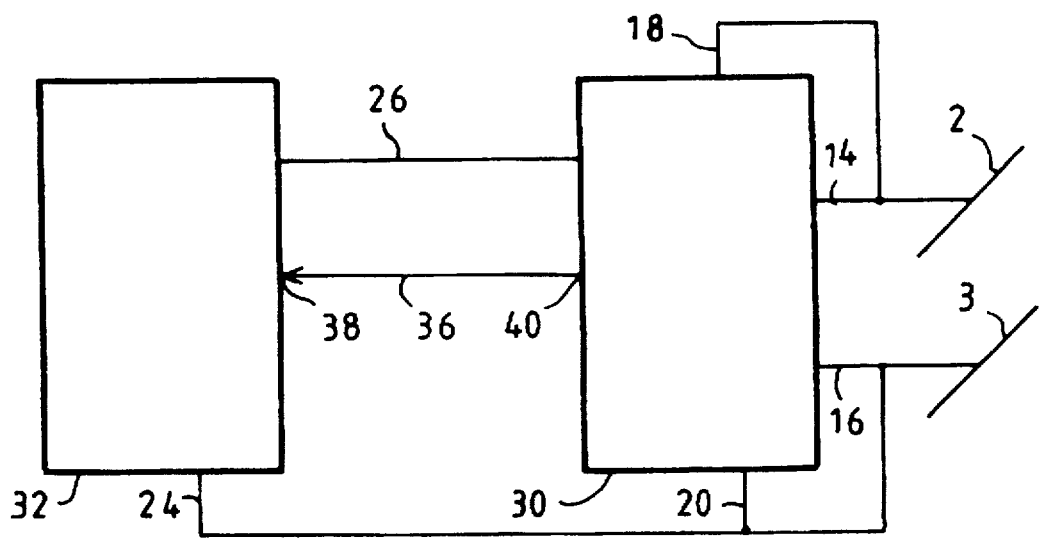

Shown in FIGS. 2 and 3 are block diagrams of functional devices adapted to be actuated in a data communication system according to the invention.

The functional device shown in FIG. 2 comprises a communication interface 10 and an application equipment 12. Data inputs 14, 16 of the communication interface 10 are connected to the supply lines 2, 3 for transmitting data on the network or receiving data therefrom.

Further, power inputs 18, 20 of the communication interface 10 are connected to the supply lines 2, 3. Likewise, the application equipment 12 is connected to the lines 2, 3 through power inputs 22, 24.

The application equipment 12 is connected to the communication interface 10 through a first data communication line 26. This data communication line may be in the form of any communication medium known in the art, for example a pair of twisted wires, a coaxial cable, an optical fibre or tracks of a printed circuit.

The application equipment 12 and the communication interface 10 are moreover connected through a second communication line 28 termed the command line.

Shown in FIG. 3 is a second embodiment of a functional device of a communication system according to the invention.

The arrangement of this functional device is similar to that of FIG. 2 although the communication interface 30 and the application equipment 32 are different from those of FIG. 2.

In particular, the application equipment 32 does not comprise a power input similar to the power input 22 directly connected to a supply line, and the command line 28 is eliminated.

On the other hand, a power line 36 connects a power input 38 of the application equipment 32 to a supply output 40 of the communication interface 30.

Figure 4:
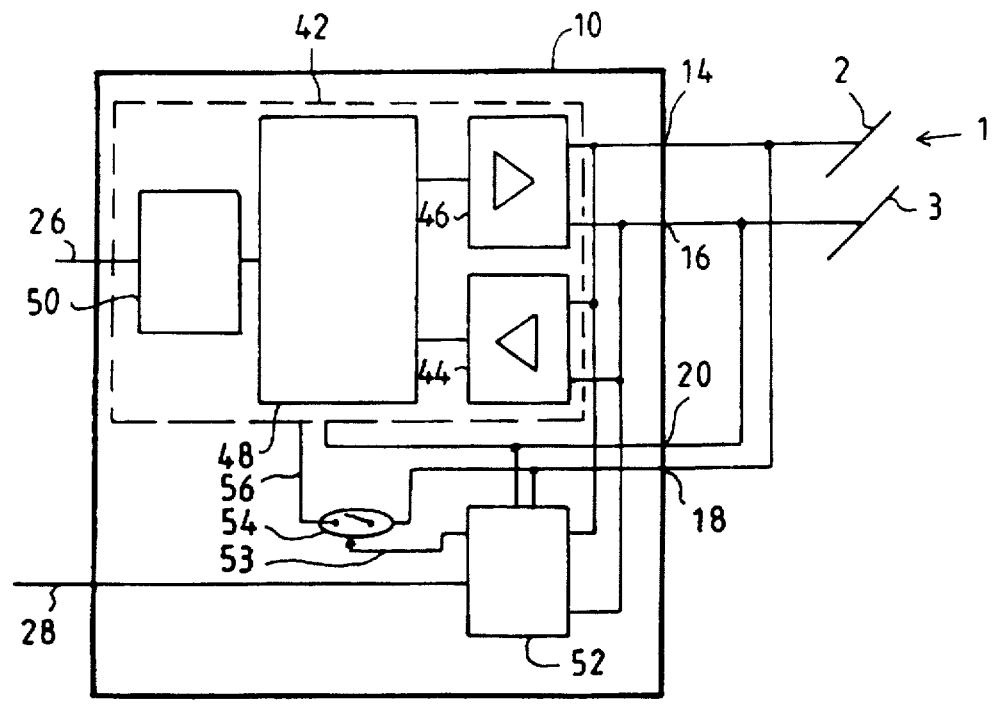
FIGS. 4 and 5 are block diagrams of the communication interfaces of the functional devices of FIGS. 2 and 3 respectively.
Figure 5:
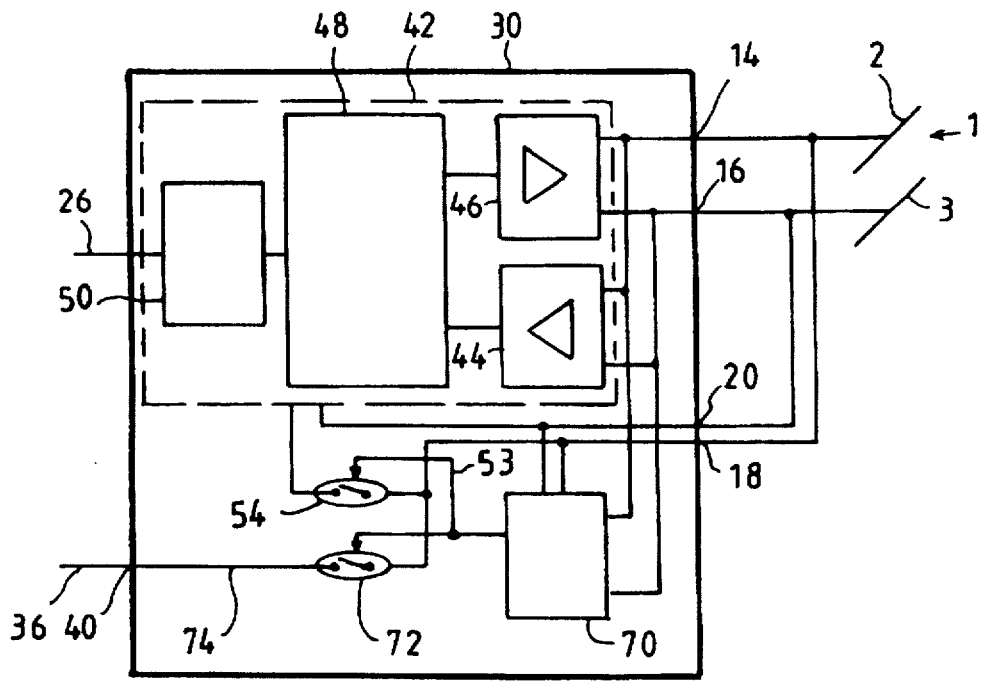

Shown in FIGS. 4 and 5 in more detail are the communication interfaces respectively 10 and 30 of FIGS. 2 and 3.

Each of the communication interfaces comprises, connected to its data inputs 14 and 16, a protocol management unit 42 defined by a rectangle in dotted lines and adapted to receive and transmit data on the network 1 in accordance with the rules managing the protocol of this network, and adapted also to receive and transmit data on the data communication line 26 to the associated application equipment in accordance with the rules managing the communication protocol pertaining to this application equipment.

Such a protocol management unit 42, known in the art, comprises for example in the conventional manner a receiver unit 44 and a transmitter unit 46 connected in parallel to the data inputs 14 and 16. These receiver and transmitter units 44 and 46 are respectively connected to the inputs and outputs of a data processing unit 48 adapted to effect protocol conversions and possibly particular processings of the data received. This processing unit 48 is moreover connected to a communication unit 50 to which the communication line 26 is connected. This communication unit 50 is adapted to transmit and receive data from the application equipment in accordance with the protocol pertaining to the latter.

The communication interface 10 shown in FIG. 4 further comprises command means 52 supplied in the conventional manner by the power inputs 18 and 20.

The data inputs of these command means 52 are connected to the communication inputs 14 and 16 of the communication interface.

These command means 52 comprise means for testing the validation of one or more predetermined criteria.

According to one embodiment of the invention these means for testing the validation of predetermined criteria comprise means for detecting predetermined data of validation of predetermined criteria transmitted on the supply lines by at least one other functional device connected to the network 1.

These predetermined data of validation of predetermined criteria may be for example at least one modulated carrier frequency or at least one non-modulated carrier frequency.

These predetermined data of validation of predetermined criteria may also be at least one series of data.

As such detecting means are known in the art they will not be described in detail.

In another embodiment of the invention, the means for testing the validation of predetermined criteria of the command means 52 comprise means for analyzing the activity ratio of the communication network, i.e. they are adapted for example to determine the lapse of time from the last communication of data effected on the network.

Such means for analyzing the activity ratio of a network are also known in the art and will not be described.

In the embodiment of the communication interface 10 shown in FIG. 4, the command means 52 are adapted to command through a command line 53 control means 54 disposed on a supply line 56 of the protocol management unit 42 connected to the power input 18. These control means 52 are adapted to feed or not feed, under the command of the command means 52, the protocol management unit 42 and are for example formed by a controlled switch known in the art.

The command means 52 also comprise means for generating and transmitting to the application equipment 12, through the command line 28, standby or reactivation command signals, as a function of the validation of the predetermined criteria.

The application equipment 12 shown in FIG. 2, comprises control means 58 adapted to feed or not feed on the output from the power input 22 connected to the supply line 2, the components of the application equipment as a function of the nature of the standby or reactivation signal received on the input of the command line 28, from the command means 52.

The control means 58 may be formed by a controlled switch, the standby or reactivation command signals then taking the form of a simple pulse for changing the state of the switch transmitted on the command line 28.

In FIG. 5, the communication interface 30 comprises, in addition to the protocol management unit 42, command means 70 fed by the power inputs 18 and 20 and comprising, in the same way as the command means 52, means for testing the validation of predetermined criteria, for example of the network 1 from the data inputs 14 and 16.

As in the communication interface shown in FIG. 4, the command means 70 are designed to command control means 54 adapted to feed or not feed, as a function of the command data received on the input from the command means 70, the protocol management unit 42.

The command means 70 are also, likewise, designed to command control means 72 of the supply 72 adapted to feed or not feed, on the output, the supply output 40 to which is connected the power line 36 feeding the application equipment 32 through its power input 38.

These control means 72 of the supply are disposed on a supply line 74 between the power input 18 of the communication interface 30 and the supply output 40 and are formed for example by a controlled switch.

Figure 6:
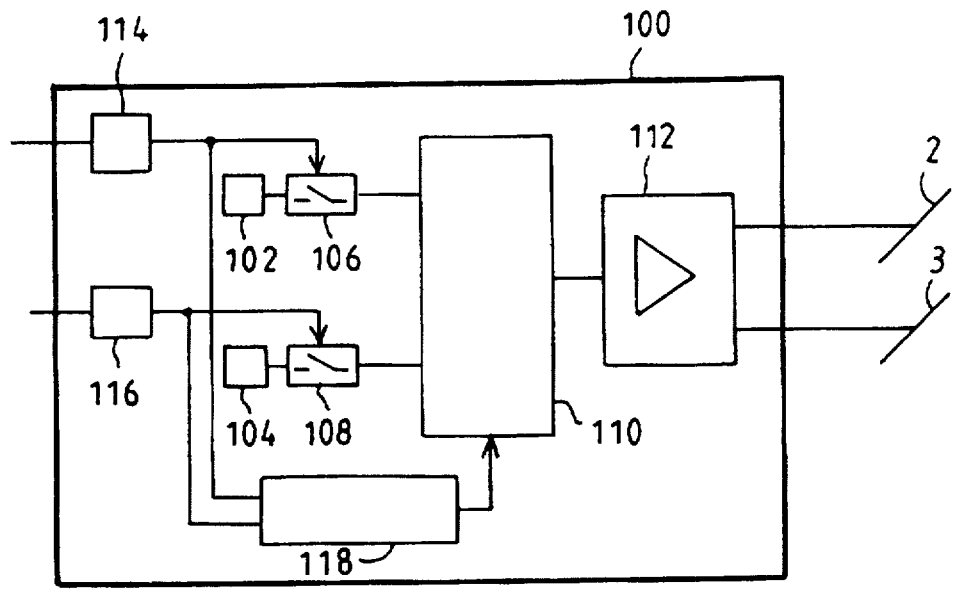
FIGS. 6, 7 and 8 are block diagrams of functional devices of a communication system according to the invention including means for transmitting data on the network.
Figure 7:
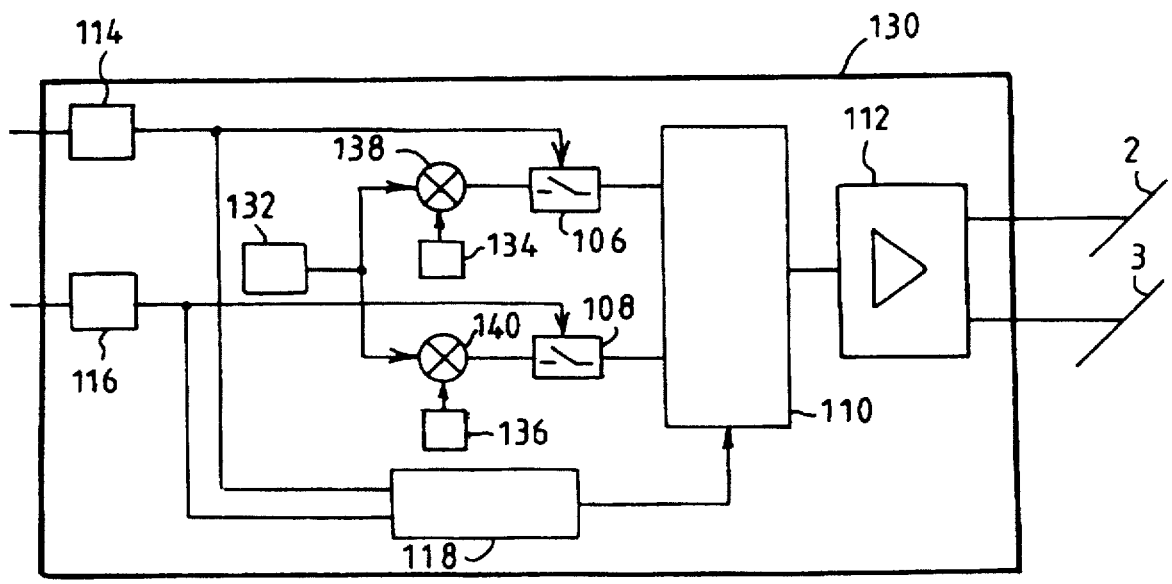
Figure 8:
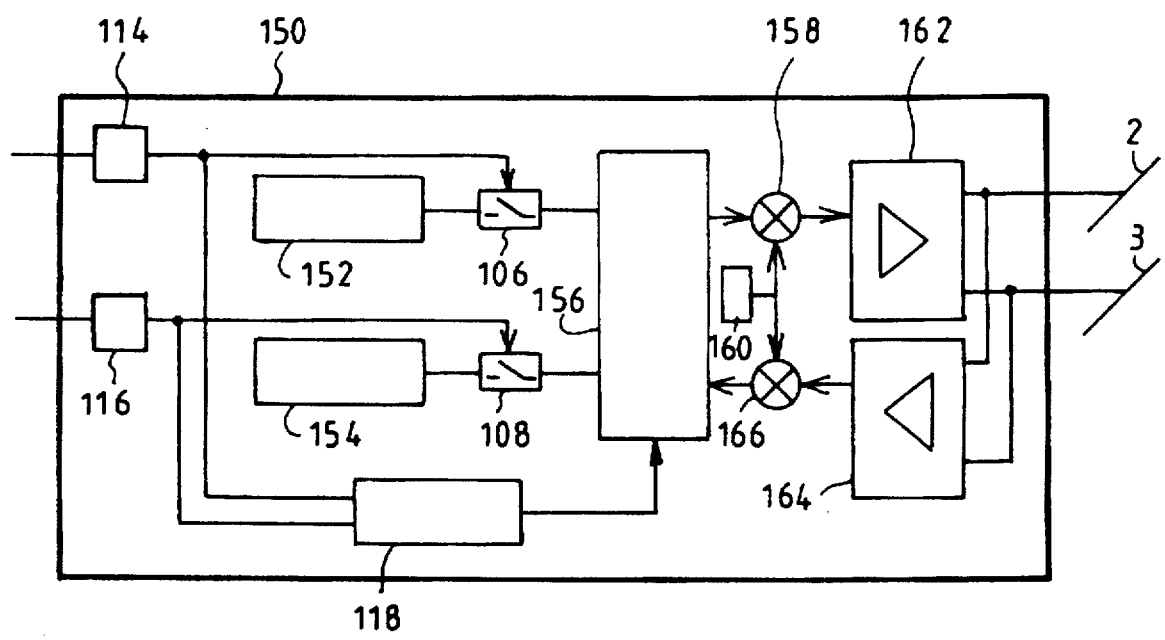

Shown in FIGS. 6, 7 and 8 are functional devices for generating and transmitting predetermined data on the supply lines 2, 3 of the network 1.

FIG. 6 shows a transmission functional device 100 adapted to transmit two non-modulated carrier frequencies in a selected manner.

This transmission device 100 comprises two carrier frequency generators 102, 104. These two different carrier frequency generators 102, 104 may be formed by two oscillators or by a single oscillator associated with a frequency divider.

The outputs of the carrier frequency generators 102, 104 are connected through controllable connection means 106, 108, to the inputs of a transmission timing device 110 known in the art.

The output of the transmission timing device 110 is connected to a transmission unit 112 known in the art whose outputs are connected to the supply lines 2, 3 of the network.

The controllable connection means 106 and 108 are controlled by detection means 114, 116 respectively of the command of the control of the supply of certain application equipments.

These detecting means 114 and 116 of the command of the control are adapted to receive data concerning the putting into the standby mode or the reactivation of certain application equipments of the network by adapted command devices (not shown). An example of such an adapted command device may be a sensor of the presence of a contact key on the vehicle.

Likewise, these control command detection means 114 and 116 are connected to the inputs of a device checking coherence 118 known in the art the output of which is connected to the transmission timing device 110.

FIG. 7 shows a functional transmitter device 130 transmitting a carrier frequency modulated in accordance with two different predetermined modulations.

This transmitter device 130 has many elements in common with the transmitter device shown in FIG. 6. These common elements arranged in a similar manner are designated by the same reference numerals.

This transmission functional device 130 comprises a carrier frequency generator 132 and two devices for generating different modulation signals 134, 136. This carrier frequency generator 132 and these modulation signal generating devices 134, 136 are connected respectively to the inputs of means for modulating the carrier frequency by modulation signals carrying respectively the reference numerals 138, 140, the respective outputs of which are connected to the inputs of the commandable connection means 106 and 108.

Shown in FIG. 8 is a functional device 150 transmitting the series of data in the form of a modulated signal. The elements common to the previously-described functional devices 100 and 130 are designated by the same reference numerals.

In this functional device two series memories 152, 154 are connected to the inputs of commandable connection means 106, 108.

The outputs of the commandable connection means are connected to the inputs of a series generating device 156 to which is also connected the output of the coherence checking device 118.

The series generating device output 156 is connected to the input of a modulator 158 whose other input is connected to a carrier frequency generator 160.

The output of the modulator 158 is connected to the input of a transmitter unit 162 whose outputs are connected to the supply lines 2 and 3 of the network 1.

A receiver unit 164, whose inputs are connected to the supply lines 2, 3 of the network 1, has its output connected to the input of a demodulator 166 whose other input is connected to the carrier frequency generator 160 and whose output is connected to the series generating device 156.

The arrangement formed by the receiver unit and the demodulator is adapted to monitor the conformity of the transmission effected by the transmitter unit 162 on the network 1 and possibly control the series generating device 156 so that it generates a new modulated series transmission on the network.

The operation of a data communication system employing the technique of carrier currents according to the invention such as that previously described will now be described in more detail.

When the motor vehicle in which the data communication system is installed is in a particular operational state in which all the application equipments are unnecessary, the communication system according to the invention permits limiting the power consumption by disconnecting some of the devices of the corresponding functional devices.

In a particular embodiment of the invention, means for testing the command means 52, 70 comprise means for analyzing the activity ratio of the communication network 1.

If after a predetermined period of time no communication is detected on the network, which constitutes the validation of a predetermined criterion, the command means 52, 70 command the control means 58, 72 of the supply of the associated application equipment, by cutting off this supply in such manner that the power consumption thereof is reduced.

In the embodiment shown in the FIGS. 2 and 4, the command means 52 open through the control means 54 the supply circuit of the protocol management unit 42 and generate a signal commanding the standby mode which they transmit via the command line 28 to the application equipment 12.

The latter opens, through control means 58 of the supply of its components, the supply circuit of the latter so as to reduce the overall consumption of the functional device.

As the protocol management unit 42 and the application equipment 12 are disconnected from the power supply 4, the overall consumption of the communication system is reduced.

When new communications are detected by the means analyzing the activity ratio of the network, which constitutes also the validation of a predetermined criterion, the command means 52 command, by transmitting a reactivation command signal, the control means 54 and 58 to reestablish the power supply of the protocol management unit 42 and of the application equipment 12. Thus, the functional device may again be used and receive or transmit data via the network 1.

In the embodiment shown in FIGS. 3 and 5, following on the detection of an absence of activity on the network 1, the command means 70 command the control means 54 and 72 to cause the opening of the supply circuit of the protocol management unit 42 and of the corresponding application equipment.

In this case, the control means 72 of the power supply of the application equipment 32 are disposed on the supply line 74 feeding the supply output 40 to which the application equipment 32 is connected through the power line 36.

In another embodiment, the means for testing the command means 52 and 70 comprise means for detecting predetermined data of validation of predetermined criteria transmitted on the supply lines by at least one functional device, such as those diagrammatically represented in FIGS. 6 to 8.

Indeed, when the vehicle is in an operational state permitting the disconnection of some application equipments, a device commanding the control of the power supply (not shown) of certain application equipments generates and transmits to the means 114 detecting the control command, a standby signal resulting in the generation on the network of predetermined data that the means for testing the validation of predetermined criteria are adapted to evaluate.

For example, this device commanding the control of the power supply of some application equipments may be a detector of the contact key or a detector of a human presence in the compartment of the vehicle.

In an embodiment of the transmission functional device, this data may take the form of a non-modulated carrier frequency (FIG. 6) of a modulated carrier frequency (FIG. 7) or of a series of data in the form of a modulated signal (FIG. 8).

The command means 52 and 70 command, as a function of the recognition of predetermined data on the network by the test means, as has already been explained, the means controlling the power supply of the application equipments and of the associated protocol management units.

The transmission functional device 100 shown in FIG. 6 generates, in response to a control command received by the control command detecting means 114, a first non-modulated carrier frequency corresponding for example to the cutting off of the supply of certain application equipments of the communication system.

To this end, the control command detecting means 114 command the connecting means 106 so that the carrier frequency generated by the carrier frequency generator 102 is sent to the transmission timing device 110.

If the device monitoring coherence 118 does not detect an incoherence between the signals received by the control command detecting means 114 and 116, the latter commands the transmission timing device 110 to permit the transmission through the transmitter unit 112 on the network during a predetermined period of time of the carrier frequency f1.

Likewise, when the control command detecting means 116 receive a control command corresponding to a reactivation signal from the device (not shown) commanding the control of the power supply, the functional device 100 transmits on the network a second carrier frequency f2 which is different from the first and generated by the carrier frequency generator 104.

This second carrier frequency f2 is adapted to permit the reestablishment of the power supply of the application equipments through their respective supply control means.

In the event that the coherence monitoring device 118 detects an incoherence between the commands received by the control command detecting means 114, 116, the latter could be made to inhibit any transmission by the transmission timing device 110 or, on the contrary, permit the transmission of the carrier frequency f2 corresponding to the reestablishment of the power supply of the application equipments.

The transmission functional device 130 shown in FIG. 7 is adapted to generate in a selective manner in response to a specific control command detected by the control command detecting means 114 or 116, a modulated carrier frequency the specific modulation of which is defined by the modulation signal generator 134 or 136.

In the case of the transmission functional device shown in FIG. 8, the reception of a control command on either of the control command detecting means 114, 116, causes the connection of one of the series memories 152 or 154 with the series generating device 156.

Inasfar as the coherence monitoring device 118 does not detect incoherence, the series generating device 156 generates a series of data of which the data field is stored in the series memory to which it is connected. This series of data is sent to the modulator 158 which, owing to the carrier frequency generated by the carrier frequency generator 160, generates on the input of the transmitter unit 162 a modulated carrier frequency of which the modulation represents data contained in the data field of the series generated by the series generating device 156.

In the conventional manner, the transmitter unit 162 transmits the modulated carrier frequency on the network 1.

The series generator 156 monitors the conformity of the transmission effected by the transmitter unit 162 by checking data received from the demodulator 166 which receives a modulated signal from the receiver unit 164 scanning the network.

It could be arranged that the numerical data series is directly transmitted on the network to the other functional devices.

However, the frequency transposition such as that achieved by the device diagrammatically shown in FIG. 8, is rendered necessary in order to respect the requirements imposed by the standards of electromagnetic compatibility at present in force in the motor vehicle construction field.

In a general way, it will be understood that a data communication system such as that described in the present application permits reducing the overall power consumption of the communication system by selectively cutting off the power supply of the application equipments of certain functional devices of the communication system when these devices are not used.

In this case, the consumption of each of the functional devices whose application equipment is disconnected, is reduced to the mere power consumption of the command means, since the protocol management unit may also be disconnected from the supply network.

What is claimed is:

1. Data communication system employing carrier currents, in particular for a motor vehicle, said system comprising in combination: an electric power supply, supply lines constituting a data communication network connected to said power supply, functional devices of said vehicle connected to said supply lines, some of said devices being adapted to communicate with one another, at least some of said functional devices comprising a communication interface and an associated application equipment communicating with other functional devices through the communication interface thereof, the application equipment being connected to the communication interface through a data communication line, said communication interface comprising control means for controlling the power supply of said associated application equipment, means for testing the validation of at least a predetermined criteria, and command means for commanding said control means for commanding, as a function of said validation of said predetermined criterion, the selective feeding of power to said associated application equipment by means of said supply lines.

2. System according to claim 1, wherein said control means of said power supply of said application equipment are integrated within said application equipment and receive on an input command data from said command means provided in said communication interface through a command line so as to feed or not feed on an output said associated application equipment by means of said supply lines.

3. System according to claim 1, wherein said control means of said power supply of said application equipment are integrated within said communication interface and receive on an input command data from said command means so as to feed or not feed on an output and through a power line the associated application equipment by means of said supply lines.

4. System according to claim 1, wherein said communication interface comprises protocol management means and control means controlling the power supply of said protocol management means and commanded by said command means as a function of said validation of said predetermined criterion for feeding or not feeding said protocol management means.

5. System according to claim 1, wherein said means for testing said validation of said predetermined criterion comprise means for detecting predetermined data of validation of said criterion transmitted on said network by at least one functional device.

6. System according to claim 5, wherein said predetermined data are formed by at least one predetermined carrier frequency signal.

7. System according to claim 6, wherein some of said functional devices comprise means for transmitting on said network at least one predetermined carrier frequency signal.

8. System according to claim 5, wherein said predetermined data are formed by at least one series of predetermined data.

9. System according to claim 8, wherein some of said functional devices comprise means for transmitting on said network at least one series of predetermined data.

10. Data communication system employing carrier currents, in particular for a motor vehicle, said system comprising in combination: an electric power supply, supply lines constituting a data communication network connected to said power supply, functional devices of said vehicle connected to said supply lines, some of said devices being adapted to communicate with one another, at least some of said functional devices comprising a communication interface and an associated application equipment communicating with other functional devices through the communication interface thereof, the application equipment being connected to the communication interface through a data communication line, said communication interface comprising control means for controlling the power supply of said associated application equipment, means for testing the validation of at least a predetermined criteria wherein said means for testing said validation of said predetermined criterion comprise means for analyzing an activity ratio of said communication network, and command means for commanding said control means for commanding, as a function of said validation of said predetermined criterion, the selective feeding of power to said associated application equipment by means of said supply lines.

* * * * *